UNITED STATES PATENT OFFICE.

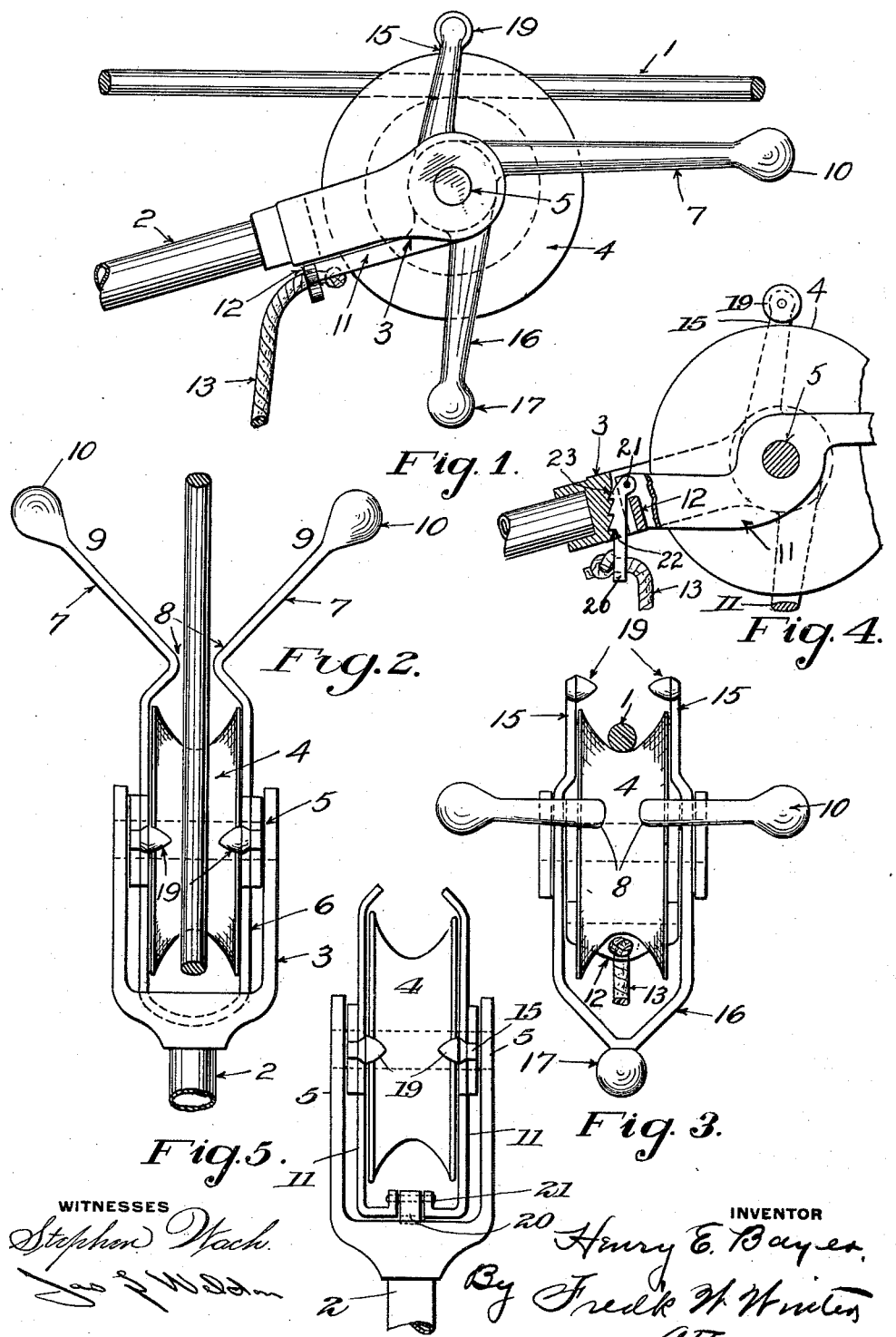

HENRY E. BAYER, OF PITTSBURGH, PENNSYLVANIA, ASSIGNOR OF ONE-FOURTH TO EDWARD E. RIECK, OF PITTSBURGH, PENNSYLVANIA.

TROLLEY GUARD AND FINDER.

1,005,797.         Specification of Letters Patent.         Patented Oct. 17, 1911.

Application filed June 13, 1910. Serial No. 566,573.

*To all whom it may concern:*

Be it known that I, HENRY E. BAYER, a resident of Pittsburgh, in the county of Allegheny and State of Pennsylvania, have invented a new and useful Improvement in Trolley Guards and Finders, of which the following is a specification.

This invention relates to trolley guards and finders for overhead trolleys.

The object of the invention is to provide a device which greatly reduces the liability of the trolley wheel leaving the wire, and which assists in again finding the wire in case the wheel should leave the same.

The invention comprises the construction, arrangement and combination of parts hereinafter described and claimed.

In the accompanying drawings Figure 1 is a side elevation of a trolley harp having my improvements applied thereto; Fig. 2 is a top or plan view of the same; Fig. 3 is an end view of the same; Fig. 4 is a sectional view showing a modification, and Fig. 5 is a plan view of the same.

In the drawing the trolley wire is shown at 1 and the usual trolley pole at 2. The pole carries a harp 3 of the usual or any desired construction, in the arms of which there is journaled the trolley wheel 4, upon journals or shaft 5. All of these parts may be of the standard or any desired form.

Pivotally mounted on the upper ends of the arms of harp 3 and preferably on the journal or shaft 5 is the trolley finding fork 6. This comprises a pair of arms 7 which extend beyond the periphery of the wheel 4, and then converge or bend inwardly toward each other as at 8 to form a comparatively narrow space or gullet therebetween, and then diverge outwardly as at 9 and terminate in rounded or bulbous ends 10. The base of the fork has the side portions 11 which in vertical planes are disposed at an angle to the arms 7 and extend downwardly as shown and are connected by the cross piece 12 which lies underneath the trolley harp and is arranged to have secured thereto the usual trolley rope 13. As shown, said cross piece 12 is provided with a hole through which the trolley rope is passed and knotted on the opposite end. The trolley rope 13 need have no other connection with the trolley pole than that described. The arms 7 of the fork are quite long and overbalance the base portion of the fork, so that in normal operation the cross piece 12 is held against the lower face of the harp 3 with the arms of the fork projecting rearwardly and substantially horizontally and entirely out of the way of the cross wires or cross arms which support the trolley wire 1, and therefore will not strike against any such parts. The trolley rope 13 may, if desired, be connected to an automatic winding device. Should the trolley wheel leave the wire the conductor will as usual seize the rope and pull the trolley pole down. This automatically swings the arms 7 to substantially vertical position so that said arms project beyond the wheel 4 in an upward direction. The space between the ends of the arms 10 is ample, so that it is an easy matter to catch the trolley wire therebetween, and when once caught the wire is guided by the diverging arms through the narrow portion or gullet 8 between said arms and into the groove of the trolley wheel. This makes it comparatively easy to find the wire in case the wheel should leave the same. The rounded or bulbous ends of the arms not only give sufficient weight to hold the fork in substantially horizontal position when the rope 13 is slack, but also prevent the wire from catching on the same when attempting to replace the trolley on the wire.

In addition to the finding fork described I provide a guard for reducing the liability of the wheel leaving the wire. This guard comprises a pair of arms 15 pivotally mounted to the harp arms, and preferably upon the journal or shaft 5, and extending upwardly beyond the periphery of the wheel. Each of these arms is provided with a pendulous or depending portion 16 which at their lower ends are connected and weighted or provided with a bulbous portion 17 of sufficient weight to at all times hold the guard arms 15 substantially upright irrespective of the angular position of the trolley pole 2. Preferably the guard arms on the two sides will be connected at their lower ends, as shown, but if desired the depending portions 16 may be entirely separate and independently weighted.

The upper ends of the guard arms 15 project very slightly above the edge portions of the trolley wheel and are there provided with inwardly projecting portions 19 which may be hardened and preferably are rounded or beveled, preferably being somewhat egg-shape, as shown in the drawings, and projecting inwardly such a distance as to leave the space therebetween only slightly wider than the diameter of the trolley wire. These inwardly projecting portions obviously prevent the trolley wire from running up out of the wheel on the side edges, which is the most frequent cause of the wheel leaving the wire, and particularly when rounding curves where the wire makes an angle in the groove of the wheel and is very liable to run out of the same on one side. On account of these projections being rounded, they do not prevent the trolley wheel from being readily pulled from the wire when desired, and also do not interfere with the wheel being again placed on the wire. These end portions project beyond the periphery of the wheel to only such a small distance as not to contact with the switches or the suspending means for the trolley wire, so that the latter will not become battered by the use of this device. On account of being pivoted these guard arms can swing backwardly out of the way in case they should come in contact with anything adjacent to the wire.

The cross piece 12 of the fork is curved, and the bottom cross connection of the guard arms 15 is of such shape, that they will not catch on the wire in case the wheel leaves the wire and gets above the same.

It will be observed that the guard arms 15 lie outside of the arms 7 of the finding fork. Consequently, the rotary movement of the trolley wheel is not communicated to the guard arms and has no tendency to swing them from their true upright position, which is of importance, as it enables the guard projections to always lie directly above the wheel.

Fig. 4 illustrates a modification of the finding fork which is particularly adapted for use when the rope 13 is secured to an automatic winding device or other means. In such case the rope is kept fairly taut and if the fork were freely pivoted it would be held constantly in a vertical position and strike against the cross arms or wires. To prevent this I provide means to keep the fork normally in horizontal position. The means illustrated comprises a locking latch 20 pivoted to the cross bar 12 of the fork at 21 and provided with ratchet teeth 22 adapted to engage teeth 23 on the harp 3 and lock the fork against pivotal movement. The arms 11 of the fork are so shaped that the cross bar 12 lies between the arms of the harp. The rope 13, in this case, is secured to the end of the latch 20 instead of to the cross bar 12. The latch 20 will hold the fork in horizontal position as long as said latch is in engagement with the teeth on the harp. When the trolley wheel leaves the wire the conductor will grasp the rope 13 and pull or force it backward, thereby swinging the latch on its pivot and disengaging its teeth from the teeth on the harp, whereupon the tension of the rope acts directly on the lower end of the fork and causes the latter to swing on its pivot into vertical position. When tension on the rope is released the fork falls to horizontal position and the latch automatically locks it to the harp.

The guard device and finder described are of simple construction and can be readily added to the usual equipment by merely providing a harp with arms spaced slightly wider than ordinary. The devices do not interfere in any way with the normal operation of the trolley, and reduce the liability of the wheel to leave the wire to such an extent that the pressure with which the trolley is held against the wire can be considerably reduced from present practice. Consequently, the trolley wheels will have a longer life when equipped with this device than under the present practice, where the wheels must be held against the wires with very strong pressure in order to prevent the same from jumping off the wire.

What I claim is:

1. A trolley comprising a trolley harp with the wheel journaled therein, a finding fork pivoted at the upper ends of the arms of the harp and comprising two divergent arms and with a base portion, and means for locking said fork to the harp.

2. A trolley comprising a trolley harp with the wheel journaled therein, a finding fork pivoted at the upper ends of the arms of the harp and comprising two divergent arms, and a locking member mounted on said fork and arranged to engage the harp and having the trolley rope connected thereto.

3. In a trolley, the combination with a harp and a wheel journaled therein, of a guard comprising arms mounted on the wheel journal and projecting upwardly and provided with pendulous portions to hold the arms vertical, said arms being provided at their upper ends with conical portions lying above the sides of the wheel, and a finding fork comprising divergent arms and a base portion arranged to have the trolley rope connected thereto, said fork being mounted on the wheel journal inside of the guard arms and thereby preventing the rotary motion of the wheel being communicated to said guard.

4. In a trolley, the combination with a harp and wheel journaled therein, of a guard comprising arms pivoted on the wheel journal and projecting upwardly with their end portions projecting inwardly above the sides of the wheel and provided with pendulous portions to hold them upright, and a finding fork comprising divergent arms and a base portion arranged to have the trolley rope connected thereto, said fork being mounted on the wheel journal inside of the guard arms and thereby preventing the rotary motion of the wheel being communicated to said guard.

In testimony whereof, I have hereunto set my hand.

HENRY E. BAYER.

Witnesses:
JAS. L. WELDON,
MARY E. CAHOON.

---

Copies of this patent may be obtained for five cents each, by addressing the "Commissioner of Patents. Washington, D. C."